United States Patent [19]

Joel, Jr.

[11] 4,007,339
[45] Feb. 8, 1977

[54] ARRANGEMENT SERVING OPERATOR ASSISTANCE CALLS REQUIRING ROUTING BACK TO ORIGINATING OFFICES

[75] Inventor: Amos Edward Joel, Jr., South Orange, N.J.

[73] Assignee: Bell Telephone Laboratories, Incorporated, Murray Hill, N.J.

[22] Filed: Nov. 28, 1975

[21] Appl. No.: 636,027

[52] U.S. Cl. .................... 179/27 FF; 179/18 FC
[51] Int. Cl.² ............................. H04M 3/60
[58] Field of Search ........................ 179/26

[56] References Cited

UNITED STATES PATENTS

| | | | |
|---|---|---|---|
| 2,092,465 | 9/1937 | Matthies | 179/26 |
| 3,341,662 | 9/1967 | Cerny et al. | 179/27 FF |
| 3,364,313 | 1/1968 | Scheinman | 179/27 FF |
| 3,484,560 | 12/1969 | Jaeger et al. | 179/27 FF |
| 3,731,000 | 5/1973 | Joel | 179/8 R |

*Primary Examiner*—William C. Cooper
*Attorney, Agent, or Firm*—Martin S. Landis

[57] ABSTRACT

An additional concentrator is provided in a Traffic Service Position System (TSPS) similar to that disclosed in A. E. Joel, Jr. Pat. No. 3,731,000, issued May 1, 1973, to facilitate the handling of operator assistance telephone calls requiring routing back to originating offices. More specifically, on the toll office side of this additional concentrator in addition to the normal TSPS remote toll trunks, "loopback" trunks are provided for establishing connections through this concentrator directly back to a plurality of "local" offices served by the concentrator. Operator assistance calls in which only a single digit (normally 0) is dialed are connected to these loopback trunks with the expectation that the call will be completed back to the originating or associated office. If, however, the calling party later indicates to the operator that the call is actually destined for a telephone station accessible through the toll office, then the original concentrator connection is broken-down and a new connection is established between the calling station and one of the TSPS remote toll trunks.

11 Claims, 7 Drawing Figures

ARRANGEMENT SERVING OPERATOR ASSISTANCE CALLS REQUIRING ROUTING BACK TO ORIGINATING OFFICES

FIELD OF THE INVENTION

This invention pertains to telephone equipment, and more specifically, to handling operator assistance type calls.

BACKGROUND OF THE INVENTION

Originally, operator services were provided by manually plugging cords in and out of cord boards to establish connections. As telephone traffic increased the number of cord boards and operators increased correspondingly. Then with the institution of direct distance dialing in this country, most calls could be dialed directly without any operator intervention. However, even today a substantial number of calls still require operator assistance. Normally these calls are instituted from coin stations or concern special billing categories such as person-to-person, collect, bill-to-third party, or credit card calls.

During the last 20 years several major efforts have been made to automate the operator assistance function as much as possible consistent with quality service and economic realities. One such system is called the Traffic Service Position System No. 1 (TSPS No. 1) which is described in R. J. Jaeger, Jr. - A. E. Joel, Jr. U.S. Pat. No. 3,484,560, issued Dec. 16, 1969. This system has been widely implemented and has been very effective in providing operator service in the larger cities. However, it has not been economically feasible to utilize such a large system in smaller communities.

To extend the TSPS concept to smaller communities, remote equipment (called the RTA) has been designed to function with the TSPS No. 1 to provide such service to customers geographically associated with the remote equipment. This concept also appears to be successful and in the future medium size cities will be afforded TSPS service.

However, even with the RTA as conceptually described in A. E. Joel, Jr. U.S. Pat. No. 3,731,000, it is anticipated that TSPS service will still not be provided to the small local offices or community dial offices with low levels of operator assistance traffic.

Moreover, in each of the prior art TSPS systems, operator assistance calls destined for the originating office (i.e., the calling and called stations are served by the same office) have to be completed via the associated toll office and then routed back to the originating office. Thus, a relatively simple "local" call ties up expensive toll office as well as the TSPS equipment.

It is an object of this invention to facilitate the routing of operator assistance calls back to their originating offices without the use of any facilities in the toll office.

It is a further object of this invention to economically provide basic TSPS services to very small local offices and community dial offices (CDOs) with low levels of operator assistance traffic.

It is a still further object of this invention to reduce the number of trunks to the toll office and at the same time to provide for more efficient trunk utilization.

SUMMARY OF THE INVENTION

In accordance with the principles of my invention, an additional concentrator is provided in a TSPS remote trunk arrangement conceptually similar to that disclosed in A. E. Joel, Jr. U.S. Pat. No. 3,731,000. This concentrator is situated directly between a plurality of small local offices (or CDOs) and the toll office. Two types of trunks are provided on the toll office terminations of the concentrator. First, the usual remote TSPS toll trunks are provided to handle traffic destined for the toll office, which traffic is handled in substantially the usual manner. However, the second type of trunks terminated on the toll office side of the concentrator are new TSPS "loopback" trunks having access to or associated with the local offices. These second types of trunks can be connected directly to the various local offices over dedicated facilities, or as in the preferred illustrative embodiment of my invention, these second type of trunks can be connected to the local offices via the concentrator and two-way auxiliary trunks terminated on the local office side of the concentrator.

As described more fully hereinafter, for operator assistance calls, for which only a single digit (normally a 0) was received, the calling trunk in the local office is connected to one of these loopback trunks and then extended to an operator's position in the normal manner. If the call is actually destined for the originating office, the calling party so informs the operator and the original concentrator connection is retained while a new connection is established from the one loopback trunk through the concentrator and back to the local office.

Thus in accordance with one aspect of my invention, operator assistance calls destined for their originating offices are routed directly back to the local office via the new concentrator and loopback trunks without utilizing any facilities at the toll office.

If after the first concentrator connection is established to the loopback trunk and extended to an operator the calling party informs the operator that the call is actually destined for a specified station, then the operator inputs a complete number identifying this station if it is not automatically identified at the originating CDO. If the call can only be completed via one of the usual TSPS toll trunks, then the original concentrator connection to the loopback trunk is broken-down and a new connection is established in the concentrator to one of the usual TSPS toll trunks. The call is then completed in the normal manner. However, if the call is destined for any of the local offices (including the originating office) served by the concentrator, then the loopback trunk is still utilized in the manner described above, rather than a TSPS toll trunk.

Thus in accordance with another aspect of my invention, the concentrator connections may be reestablished after the operator has received a complete number or a new number in a manner to facilitate the completion of calls minimizing the utilization of telephone plant facilities. Thus, for example a call originally connected to a toll trunk can be reconnected to a loopback trunk, after the operator inputs a complete station number identifying that the call was actually destined to a local office served by the concentrator.

Moreover, for other types of operator assistance calls in which complete complement of digits is received (e.g., 0 + 7 digit number or 0 + 10 digit number) the digits are analyzed and the initial concentrator connections established to either a loopback trunk or toll trunk depending upon whether the call is destined to a local office served by the concentrator or is destined to an office accessible through the toll office. Of course, if the calling subscriber later changes his or her mind during the initial operator processing of the call, the concentrator connection can be reestablished in accordance with the new call destination.

In accordance with another aspect of my invention, the utilization of the new concentrator reduces the number of trunks to the toll office and as a subsidiary aspect, a larger, more efficient group of trunks commonly accessible by a plurality of local offices replaces smaller, inefficient trunk groups from each local office to the toll office.

BRIEF DESCRIPTION OF THE DRAWING

The foregoing as well as other objects, features and advantages of my invention will be more apparent from a description of the drawing in which:

FIGS. 3 through 6 when arranged as shown in FIG. 7 illustrate how a TSPS system including a remote trunk arrangement is adapted with an additional concentrator and trunk circuits to beneficially complete network connections in accordance with the principles of my invention; more specifically.

FIG. 5 illustrates the circuitry in auxiliary trunk 1–2 which is substantially identical to that of trunk 1—1;

FIG. 7 illustrates the manner in which FIGS. 3 through 6 are to be arranged.

GENERAL DESCRIPTION

In this one illustrative embodiment of my invention, an existing telephone system called the remote trunk arrangement (RTA) is beneficially adapted by the inclusion therein of new circuitry to 1) serve small local offices and community dial offices with small numbers of operator assistance calls, 2) provide a more efficient trunking arrangement for operator assistance calls destined for their originating or associated local offices or CDOs, and 3) provide facilities for switching trunking arrangements after an operator connection is established to more efficiently handle calls where the calling party informs the operator that the call is destined to a new number or advises the operator of the remaining digits of the initially dialed number.

Before the specifics of my improvements are described, the existing system in which this illustrative embodiment of my invention is implemented will be described in some detail.

Figure 1:
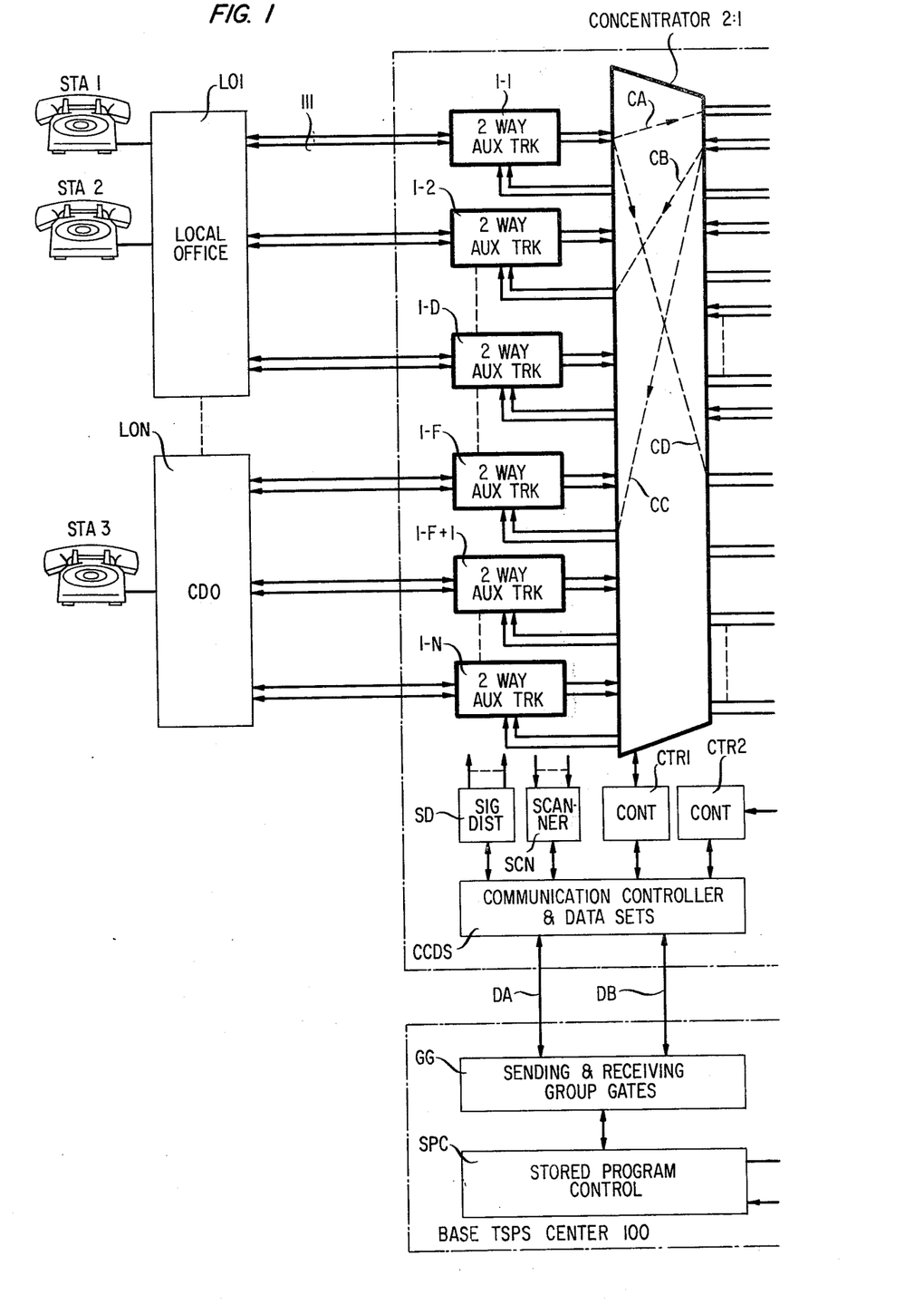
FIGS. 1 and 2 in combination illustrate one illustrative embodiment of my invention in generalized form.
Figure 2:
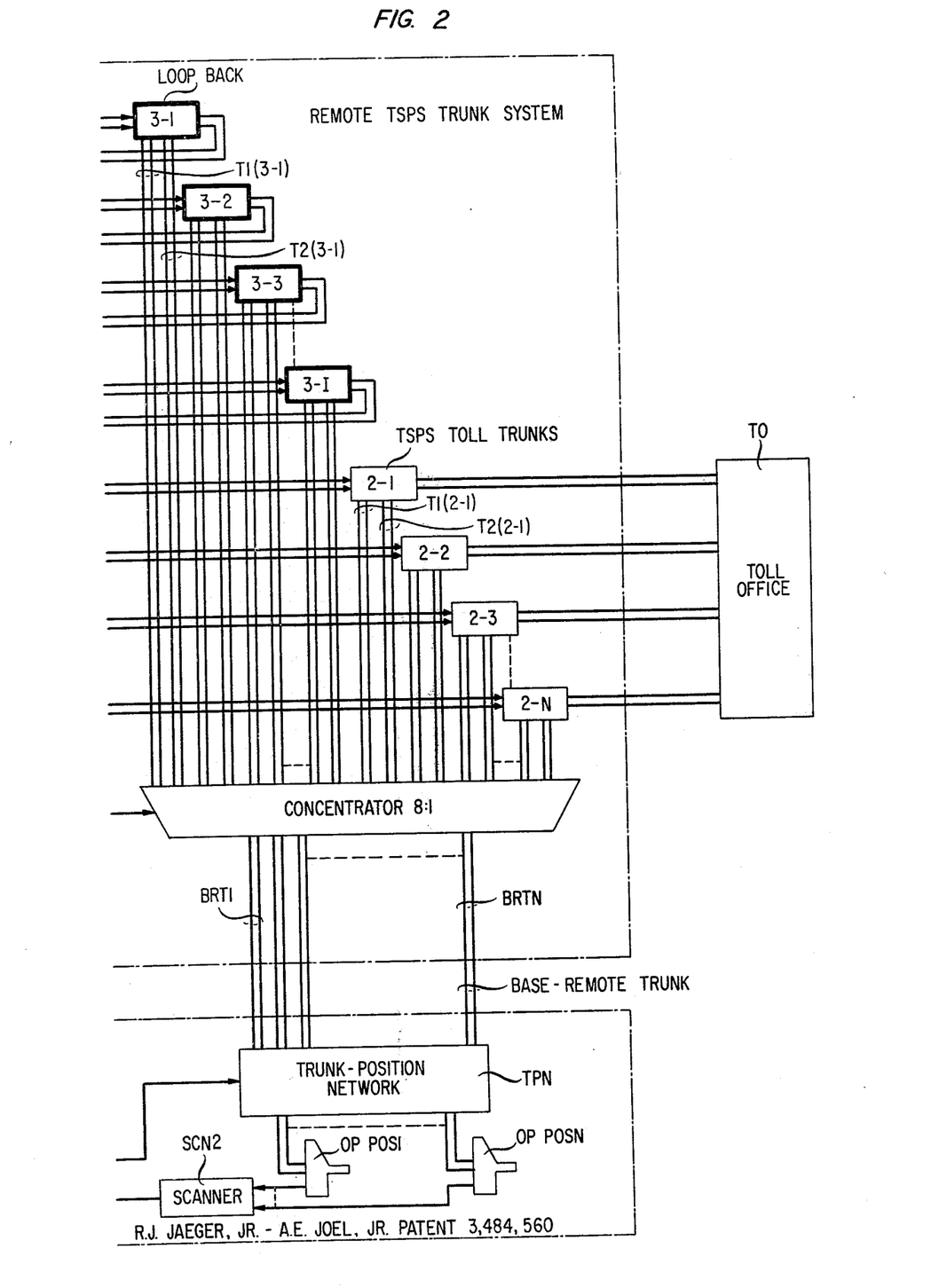

The lower portions of FIG. 1 and 2 depict base TSPS center 100. These Figures show in block diagram form the basic control, switching, and operator position elements which are included a system called the "Traffic Service Position System No. 1". TSPS No. 1 centers are presently implemented throughout the United States to automate many of the routine aspects of operator services. TSPS No. 1 is usually found in highly populated areas such as the larger cities of this country.

The control function in TSPS No. 1 is performed by Stored Program Control SPC in FIG. 1. Control SPC comprises duplicated data processing units for performing logical and arithmetic operations on stored program instructions and data supplied thereto. The primary function of Control SPC is to selectively establish connections in trunk position network TPN. These connections are normally established from operators' positions such as OPPOS1-OPPOSN to local TSPS trunks (not shown) which in turn are connected to the calling and called stations. For further reference, TSPS No. 1 is extensively described in R. J. Jaeger, Jr - A. E. Joel, Jr. U.S. Pat. No. 3,484,560 issued Dec. 16, 1969, and in the Dec. 1970 issue of the Bell System Technical Journal.

In a first improvement in TSPS No. 1, additional circuitry was provided so that the operators could be remote from the main TSPS center, and accordingly operator centers could be established in areas where sufficient numbers of operators were available. The remote operator positions were controlled utilizing carrier systems in which control information was interspersed on a time-division basis with the voice communication.

In a second improvement as taught by A. E. Joel, Jr. U.S. Pat. No. 3,731,000, issued May 1, 1973, groups of TSPS trunk circuits could be located a substantial distance away from the main TSPS center 100. Accordingly, it then became feasible to serve toll centers which were not large enough to support an entire TSPS complex by themselves. A concentrator switch such as switch 8:1 in FIG. 2 was provided to connect the remote TSPS trunk circuits (i.e., trunks 2-1, 2-2...2-N) to the TSPS center 100 so that the number of long-haul voice paths to the TSPS center could be reduced. The concentrator switch was controlled based upon control information conveyed over the voice paths.

In a third improvement on the basic TSPS System, as disclosed in J. A. Hackett application Ser. No. 560,316, filed Mar. 20, 1975, now U.S. Pat. No. 3,958,111, issued May 18, 1976, the remote TSPS trunk circuits such as trunk circuits 2-1 to 2-N in FIG. 2, and operators' positions (not shown) are located close to the same remote facility so that common control apparatus in the remote facility can be utilized to control both the operators' positions and the establishment of connections in concentrator 8:1 between the base remote trunk circuits (BRT1-BRTN) and TSPS toll trunks (2-1 to 2-N). In the previous remote system, the control information was conveyed over the same communication paths as the voice information. However, in this third improvement, duplicate data links such as DA and DB in FIG. 1 were provided for the conveyance of Control information from the SPC to the remote TSPS equipment.

To further elaborate on the prior art portion of the equipment illustrated in FIGS. 1 and 2, the communication of control information over data links DA and DB between sending and receiving group gates GG and the communication controller and data sets CCDs, is described in more detail in L. A. Rigazio patent application Ser. No. 518,477, filed Oct. 29, 1974, now U.S. Pat. No. 3,912,881, issued Oct. 14, 1975, and L. Caron patent application Ser. No. 479,891, filed June 17, 1974, now U.S. Pat. No. 3,927,392, issued Dec. 16, 1975, and L. Caron U.S. Pat. 3,866,172 issued Feb. 11, 1975 and in the above-mentioned Hackett application. More specifically, the Caron patent "172" deals with the transmission of data words prior to the receipt of acknowledgements for previously transmitted data words. The Caron application deals with the compensation of skewing in the reception of data words transmitted over the duplicated data links. The Rigazio application deals with diagnosing scanning problems in the remote trunk arrangement. The Hackett application deals with remotely diagnosing the scanners, signal distributors, and other logic in the remote TSPS equipment.

Scanner SCN in FIG. 1 comprises well-known scanning apparatus for autonomously scanning, inter alia, a plurality of trunk scan points to detect the state of various equipment in the trunks. Scanner SCN is adapted to generate reports for conveyence to the SPC indicating substantial changes in the status of calls such as on and off hook indications and dialed digits. A suitable scanner is comprehensively described in D. J. Sassa U.S. Pat. No. 3,894,191, issued July 8, 1975.

Concentrator 8:1 in FIG. 2 comprises two stages of switches controllable by controller CTR2 to selectively connect the T1 and T2 leads of trunks 3- and 2- to base remote trunks BRT1-BRTN. A suitable concentrator is described in A. F. Bulfer patent application, Ser. No. 512,256, filed Oct. 4, 1974, now U.S. Pat. No. 3,935,394, issued Jan. 27, 1976. This application identifies a suitable controller and describes how the SPC communicates with this controller over the one-out-of-N bus. Here the controller CTR2 is remotely situated from the SPC and, accordingly, cannot communicate directly with the SPC but must instead communicate with the SPC over the duplicated data buses described in the above-mentioned L. A. Rigazio application in regard to FIG. 2 therein.

The preceding has described only he prior art TSPS system in which my invention is utilized. Now turning to the specifics of this one illustrative embodiment of my invention, in addition to concentrator 8:1 in the prior art, I beneficially add concentrator 2:1 in FIG. 1 directly between the local office(s) and toll office. The utilization of this second concentrator allows many very small local offices and CDOs to be served by a remote trunk arrangement. Typically these small local offices and CDOs comprise step-by-step equipment and may have only 2 to 10 low usage trunks arranged to serve operator assisted calls. In the past, small cord boards have been provided with the local office to provide operator services. By extending the centralized operator concept inherent in TSPS No. 1 to these small offices, greater efficiency in scheduling operators can be realized and accordingly the cost of providing operator services is decreased. Moreover, small trunk groups from each local office to the toll office are replaced by a higher usage, commonly accessible trunk group 2—.

Each local office will still have the same number of operator trunks, but these trunks are now terminated on concentrator 2:1 rather than on a small cord switchboard. In this illustrative embodiment, concentrator 2:1 provides for a two to one concentration; however, it is anticipated that in other embodiments, different concentration levels may be utilized depending upon the usage and type of call placed via the 1- trunks, for example. This concentrator is selectively controllable to connect these "operator" trunks 1- to the normal remote toll TSPS trunks 2-1 through 2-N. Moreover, this concentrator is also adapted to connect the "operator" trunks to new loopback trunks 3-1 to 3-I which are utilized to direct calls back to their originating offices or associated offices served by concentrator 2:1.

Before the many beneficial contributions of concentrator 2:1 are described in detail, it may be helpful to describe the function served by the TSPS system. Typically, operator assistance calls are generated by telephone stations such as STA1, STA2, or STA3 which may be coin, business or home stations and are representative of the numerous telphone stations served by each of the depicted offices LO1-LON. Operator assistance can be requested in two basic ways. First, the calling party can control the station to dial only a 0. Or secondly, the calling party can dial a 0 plus complete 7 or 10 digit number. When the calling party dials only a 0, typically he or she intends either to inform the operator of the remaining digits or is requesting some kind of special assistance. This is called a 0- call. In contrast, when the calling party dials an entire number preceded by a 0 this is called a 0+ call which normally is a person-to-person, collect call or bill to third-number call.

In the prior art arrangements, toll trunks such as 2-1 were connected directly to local offices and a typical call was extended from a station such as STA1 (now assuming office LO1 was relatively large) directly to trunk 2-1 and over conductors T1 (2-1) through concentrator 8:1 and then over one of the base remote trunks such as BRT1 and through trunk position network TPN to an operator's position such as OPPOS1. The operator then asked the calling party what type of call was desired and for the remaining digits if only a 0 was dialed. For coin stations the operator would also inform the calling station of the charges required to place the call and the operator would then listen to tones, received over this above-described path, indicating that the proper amounts had been deposited in the coin station. Then control SPC would control multifrequency generators (not shown) associated with network TPN to outpulse the number of the called stations to toll office T0. This outpulsing would be done over the following route, through network TPN over base remote trunk BRTN (for example) through concentrator 8:1 over pair T2 (2-1) to trunk 2-1 and through trunk 2-1 to the toll office. The operator would then be connected to toll office T0 and could hear the simulated ringing being applied to the called station and could detect if and when the called station answered. Then the operator would depress the disconnect key and start timing key on his or her position and then the call would be completed directly through toll trunk 2-1, and the various connections through concentrator 8:1 and network TPN would be knocked down. Accordingly, the operator could then serve another call.

In my improvement, calls requiring routing to toll office T0 are handled in a similar manner except that the calls are now routed through a two-way auxiliary trunk such as 1-1 through concentrator 2:1 to the toll trunks such as 2-1. In prior art arrangements, 0- (just 0) and 0+ calls were handled similarly and both types were routed to the toll trunks 2-. The 0- calls in the prior art which were destined for the originating office were routed through toll office T0 and then back over other trunking, not shown, to the local office. Thus for a simple local operator assistance call, a TSPS toll trunk was required and other trunking equipment was required back from the toll office to the local office. T0

In accordance with one feature of my invention, loopback trunks 3- are provided with dual terminations on concentrator 2:1. For 0- calls these loopback trunks are utilized to loopback the call via a 2-way auxiliary trunk 1-to the originating office without tying-up expensive toll office equipment.

To elaborate, in accordance with the principles of my invention, trunks 1-1 are adapted to detect any dial digits received from a local office L01-L0N. Scanner SCN scans these trunks to detect these digits and reports them to the SPC over the data links. If only a 0 was received (0-call) or if a 0+ call destined for one of the offices served by concentrator 2:1 is received, then the SPC in accordance with its stored program generates the appropriate orders and transmits them over the data links to controller CTR1, which then connects the calling auxiliary trunk 1- to an idle one of the loopback trunks 3-.

However, if a toll call is received as determined by the SPC decoding of the received digits, then the calling auxiliary trunk 1- is connected to one of the toll trunks 2-under the control of the SPC and the call is completed in the normal fashion. To elaborate further, if the call is initially determined to have a local destination and is therefore connected to a loopback 3- trunk, and if the calling party then informs the operator of additional digits or a new number, the SPC reanalyzes the new dial information input by the operator and determines whether the call can still be completed via the 1- trunks. If it cannot be so completed, the connection in concentrator 2:1 between the calling auxiliary trunk and the loopback trunk is brokendown and a new connection is reestablished between the calling auxiliary trunk and one of the toll trunks 2-.

The operation of this one illustrative embodiment of my invention will now be described in further detail in terms of sample calls instituted by station STA1 in FIG. 1. Assuming that station STA1 is utilized to dial only a single 0 (ten pulses), then the step-by-step selectors in local office L01 connect the station to one of the two-way auxiliary trunks 1-1 through 1-D serving local office L01. Trunk 1-1, for example, is seized, by a closure of the trunk conductors, the tip and ring leads of pair 111. The only digit dialed on this type of call (i.e., "0") is used by the first selector in the local office or CDO to reach trunk 1-1. Scanner SCN detects this seizure and provides an off-hook indication to the SPC in the manner described in the above-mentioned Sassa application. Then the SPC in accordance with its program institutes the normal answer timing and determines after a predetermined time interval that no additional digits follow and therefore concludes the call is of the 0- variety. Since this is a 0-call, the SPC sends an order out to the remote arrangement, which order is received by controller CTR1 and indicates that trunk 1-1 is to be connected to an idle loopback trunk such as 3-1. Responsive to this order, CTR1 operates to establish the desired connection CA. This loopback routing is chosen because a majority of 0- calls are actually destined for their originating offices. Continued checks are then performed to ensure that connection CA has been established. The control SPC sends another order to controller CTR2 to control concentrator 8:1 to connect tip and ring leads T1 (3-1) to an idle one of the base remote trunks such as BRT1. The SPC then controls network TPN to connect trunk BRT1 to an idle operator's position such as OPPOS1. The operator at this position is then audibly connected to station STA1 via the above-described routing and converses with the calling party. If the calling party only wanted information, the operator would provide this information and the call would be terminated releasing the concentrator.

However, assuming that the calling party at station STA1 wanted to make a person-to-person call to station STA2, then the operator at position OPPOS1 would input the 7-digit number identifying station STA2, which number was orally received from station STA1. Scanner SCN2 scans the operator positions and would so inform the SPC of these digits. Control SPC would process this number in the normal manner and since auxiliary trunk 1-1 was handling the call, would determine that the call was actually destined for the same office as the office from which the call originated. Accordingly, control SPC would provide a second command to controller CTR1 to control concentrator 2:1 to establish a connection such as CB from loopback trunk 3-1 to an idle auxiliary trunk such as 1-2. This connection would then be extended from trunk 3-1 to station STA2 via local office L01. This is accomplished by providing a dial pulse generator in trunk 1-2 and controlling it to dial the four-digit number identifying station STA2. It should be noted that each of the auxiliary trunks (1-) as hereinafter explained in detail, is actually a two-way trunk and can handle calls both to and from local office L01. Assuming that station STA2 is answered, the operator then asks if the requested person is present; and if he or she is present, then the operator presses a start timing key and then the disconnect key. Responsive to these key depressions, control SPC disestablishes the operator connections in both concentrator 8:1 and in network TPN; and the call continues over trunk 1-1, connection CA, trunk 3-1, connection CB and trunk 1-2. When the call terminates, trunks 1-1, 1-2 and 3-1 and associated concentrator connections release, so that they can be used for other calls.

Assuming in the previous 0- call placed by station STA1, that the calling party indicated a calling station number which could be reached only through office T0 (i.e., the called station was not associated with one of the offices served by concentrator 2:1). This call would still be connected to an idle 3- trunk because it was a 0-call; however, when the operator entered the new number, the SPC would analyze this number as detected by scanner SCN2 and determine that a 3- trunk could not be utilized to complete the call. Accordingly, the SPC would control concentrator 2:1 to release connection CA and instead establish a connection such as CD to an idle one of the toll trunks 2-. Assuming that connection CD was in fact established to trunk 2-1, the operator would be reconnected to the calling station via leads T1 (2-1), concentrator 8:1, trunk BRT- and network TPN. Then SPC would establish another connection to trunk 2-1 via leads T2 (2-1) and the network TPN in the usual manner. Multifrequency tones identifying the called number (previously entered by the operator) would then be outpulsed through network TPN, concentrator 8:1, and over leads T2 (2-1) to toll office T0 which would complete the call in a normal manner. When the called station answers, the operator would handle the call in a manner identical to that previously described.

Thus in accordance with one aspect of my invention 0- calls (only digit 0 dialed) are first routed to loopback trunks 3- with the expectation that such calls are actually destined for one of the local offices served by concentrator 2:1. If however, the calling party indicates that a station served via toll office T0 is desired, then in accordance with another aspect of my invention the connection in concentrator 2:1 to one of the 3- trunks is released and a connection is established to one of the 2- trunks and the call is completed in the normal manner.

Moreover, for 0- calls that are not destined for the originating office, but are destined for one of the associated offices served by concentrator 2:1, then a connection such as CC is established in concentrator 2:1 between a 3- trunk and one of the 1- trunks associated with the terminating office. Thus when station STA1 institutes a 0- call which is actually destined for station STA3, the call is not completed via toll office T0 but is routed through concentrator 2:1 from one of the 3- trunks to one of the auxiliary trunks 1-F through 1-N.

Moreover, locally destined 0+ calls (for which a full complement of digits preceded by a 0 is received), are also expeditiously handled utilizing a loopback 3- trunk and a 1- trunk connection to the terminating office. Of course, 0+ calls destined for toll office T0 are handled in the usual manner via one of the TSPS toll trunks 2-.

Thus in summary, the adaptation of an additional concentrator (2:1), auxiliary trunks (1-), and loopback trunks (3-) in the prior art remote trunk arrangement beneficially allows TSPS service to be extended to greater numbers of small local offices and in addition provides a more efficient routing technique for operator assistance calls destined for the offices served by concentrator 2:1. Moreover, the overall number of trunks to the the toll office are reduced because a relatively larger trunk group 2- is more efficient than the small trunk groups from each local office to the toll office.

Specific Description

To further explain the operation of this one illustrative embodiment of my invention, FIGS. 3 through 6 will be consulted in regard to the overall operation of the TSPS arrangement disclosed in FIGS. 1 and 2.

Figure 3:
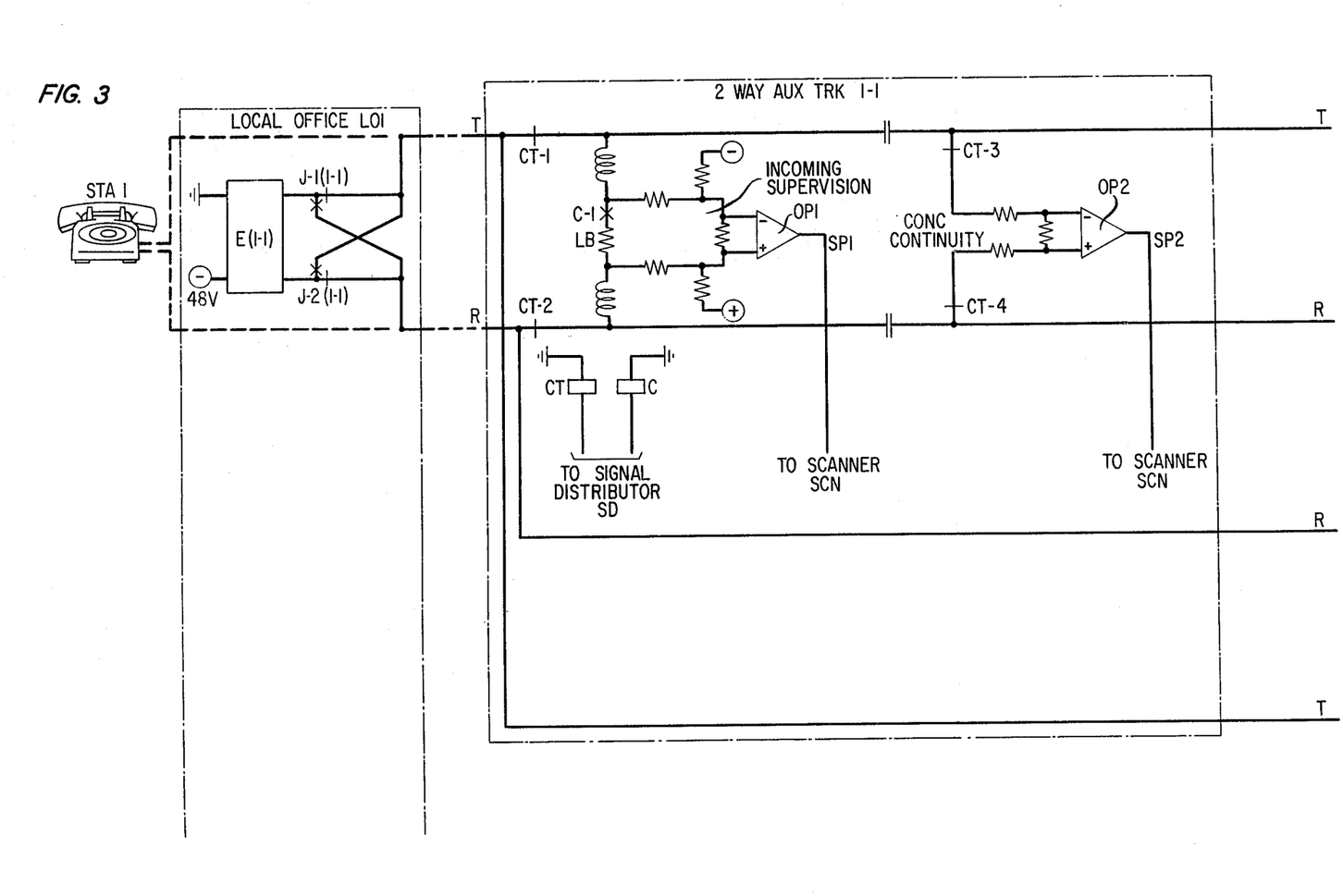
FIG. 3 illustrates the detailed circuitry in two-way auxiliary trunk circuit 1—1 shown in FIG. 1.

Assuming as before that station STA1 institutes a call, relay E (1-1) in FIG. 3 in a local office trunk in office LO1 normally applies negative battery to the ring lead via contacts J-2 (1-1) and also applies ground to the tip lead via contacts J-1 (1-1). When a connection is established in the local office from station STA1 to seize the local office trunk, the J relay is operated by equipment not shown in the normal fashion and contacts J-1 (1-1) and J-2 (1-1) operate to reverse the application of battery to the tip and ring leads. This reversal is detected in two-way auxiliary trunk circuit 1-1 at the remote TSPS trunk system in FIG. 3 by operational amplifier OP1. This amplifier is arranged and biased in the normal manner to detect variations in tip and ring voltages. The potentials associated with this biasing do not operate any relays in the local office. More specifically, the reversal of office battery causes the state of lead SP1 to be changed by amplifier OP1. The state of this lead is periodically scanned by scanner SNC in FIG. 1; and after determining that this reversal has a duration of two scans, scanner SCN generates an off-hook report which is conveyed to the SPC. As mentioned previously, the manner in which such reports are generated is described in some detail in the above-mentioned Sassa patent.

It is anticipated that the local trunk in FIG. 3 will be an existing two-way trunk now utilized to connect a first selector to a cord board and to connect the cord board to an incoming selector. These local trunks do not presently have pulsing capability since they are used only for 0- calls which are connected by the first selector to the cord board. These local trunks could be adapted with standard loop pulsing or battery-ground equipment to communicate dial digits on 0+ calls to the auxiliary trunks 1-; however to simplify this disclosure and to minimize the expense of converting these local trunks to normal pulsing procedures, an unorthodox reverse battery signaling technique is described in which the battery and ground potentials of the tip and ring leads are reversed for each pulse in each digit. Of course, the use of the more conventional pulsing technique is very well known and could be easily implemented in my arrangement.

Then, responsive to each dial pulse generated at station STA1, the J relay releases and then reoperates to first reverse the application of battery to the tip and ring leads and then to return these leads to their off-normal battery states. Each pulse in each digit is represented by a single transition from reverse office battery to normal battery. Amplifier OP1 is adapted to detect each SP1 these transitions and the state of lead SP1 changes to reflect the operation and release of the J relay. Scanner SCN monitors the state of lead SP1 to count the number of pulses in each dial digit and by performing normal interdigit timing is able to differentiate between digits. After each complete digit comprising from 1–10 pulses is received, scanner SCN generates a report for conveyance to the SPC. After receiving reports of all dialed digits, the SPC then performs a rudimentary check on the dialed information to determine whether the call is destined for a local office served by concentrator 2:1 or is destined to an office served by toll office T0 and accordingly whether the calling auxiliary trunk 1-1 should be connected to a loopback trunk 3- or should be connected to a normal remote TSPS trunk 2-.

Figure 4:
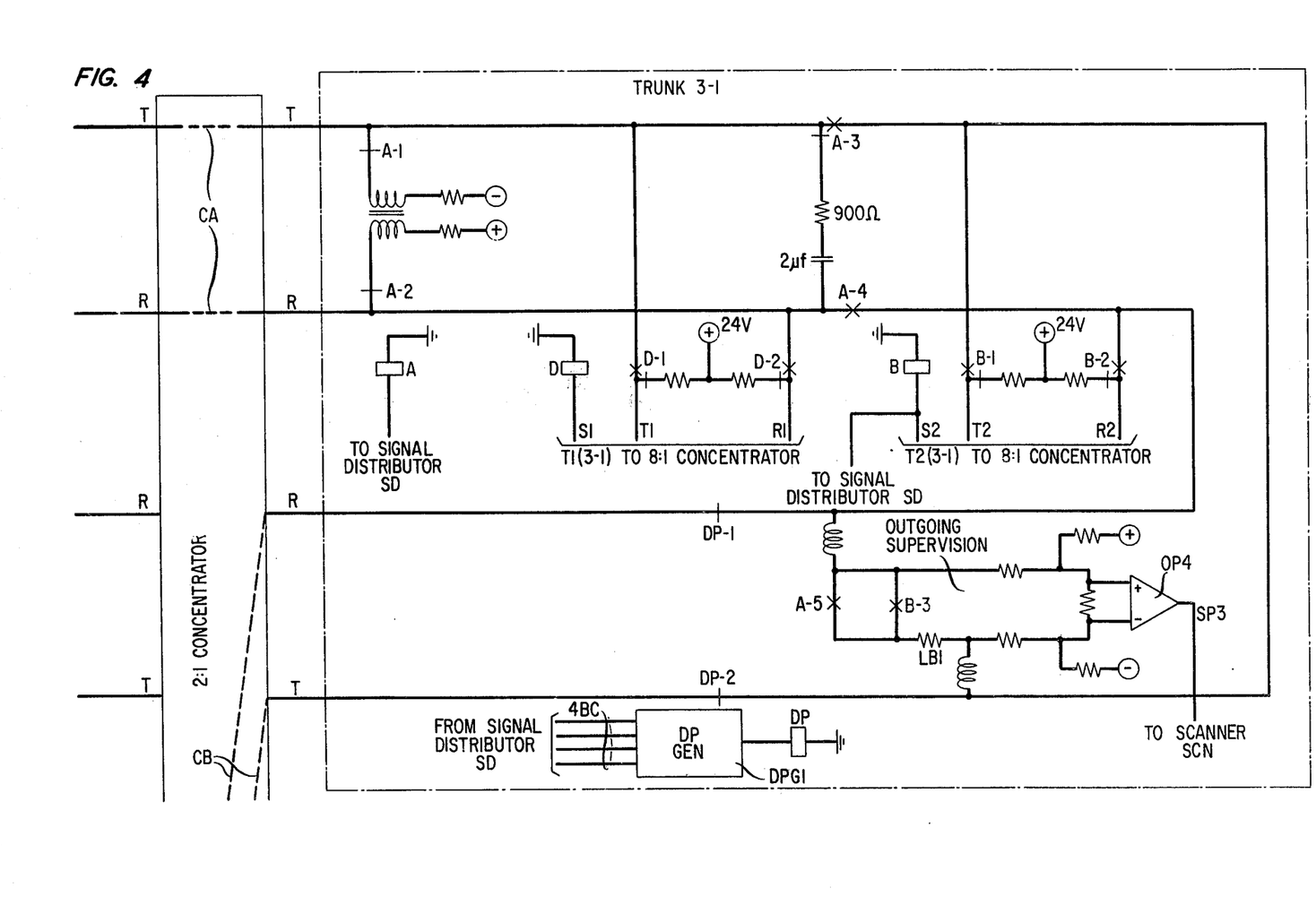
FIG. 4 illustrates the detailed circuitry in "loopback" trunk 3–1 shown in FIG. 2.

Assuming that station STA1 only dialed a single "0", the ten pulses generated by the station are used by the first selector in office LO1 to connect the station to the trunk therein. Then responsive to the operation of contacts J-1(1-1) and J-2(1-1) as detected over lead SP1, scanner SCN generates an off-hook report. No digits are outpulsed by office LO1 to trunk 1-1 and, accordingly, scanner SCN does not generate a dial digit report. Responsive to the off-hook report, the SPC institutes normal answer timing and after a predetermined time determines that this is a 0- call because the scanner has not reported the reception of any digits. Thus, the SPC assumes a local call is requested and consults its memory map indicating the busy status of the trunk circuits and selects an idle 3- trunk. As mentioned previously, a 3- trunk is selected for all 0- calls since it is expected that such calls will probably be routed back to their originating office. Assuming that trunk 3-1 is idle and is selected by SPC, the SPC sends the appropriate controller order over the data links to controller CTR1. Responsive to this order, the controller causes concentrator 2:1 to establish connection CA between trunks 1-1 and 3-1. Connection CA is also illustrated in FIG. 4 and actually comprises two connections, one for the tip lead and one for the ring lead. A continuity test is then performed across connection CA to ensure that the proper connection has been established. To elaborate, a negative potential is applied in trunk 3-1 via contact A-1 and a positive potential is applied to the ring lead via contacts A-2. These potentials should be detected by operational amplifier OP2 via contact CT-3 and CT-4, and the appropriate indication generated over lead SP2 of the scanner. The detection of both potentials indicates that the proper connection has been established. Scanner SCN so notifies the SPC. Such a report is not described in above-mentioned Sassa patent, but is straight forward in design and only entails monitoring the specific state of lead SP2 responsive to a direct scan order from the SPC.

Upon reception of the continuity report from the scanner, the SPC then consists its memory maps and selects an idle operator's position and base remote trunk, and controls and concentrator 8:1 via controller CTR2 to cut through leads T1 (3-1) to the selected base remote trunk. With reference to FIG. 4, responsive to the operation of controller CTR2, a marking potential will be applied to sleeve lead S1 in FIG. 4 and the associated D relay will then operate. Contacts D-1 and D-2 will then operate to remove the positive 24-volt marking potential applied to concentrator 8:1. This concentrator may comprise miniature crossbar switches implemented to form a two-stage network in a manner similar to that described in the above-mentioned Bulfer application.

Assuming that leads T1 (3-1) are connected to base remote trunk BRT1 in FIG. 2, the SPC then controls network TPN to further establish the connection to an idle operator's position such as OPPOS1.

Figures 5, 7:
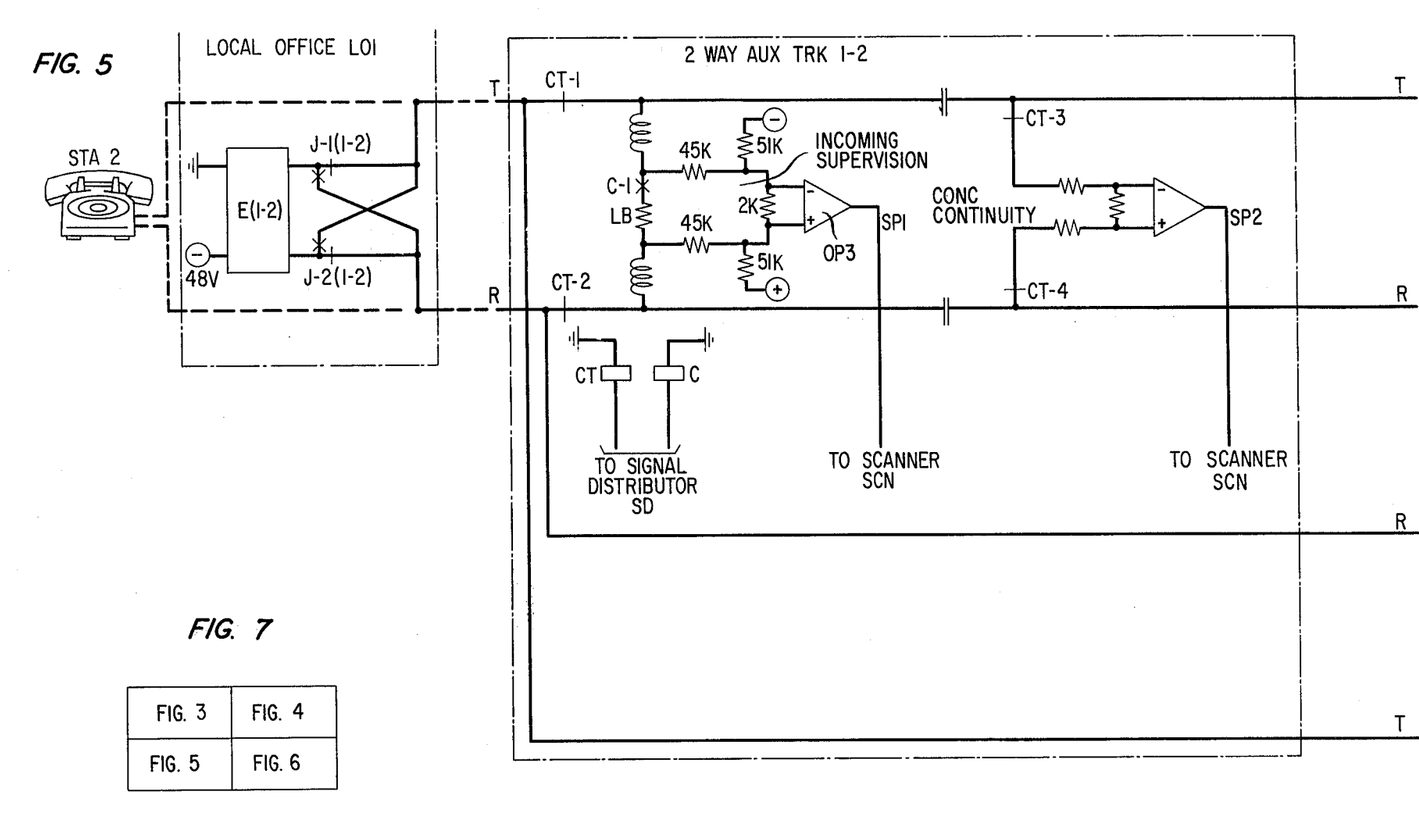
Figure 6:
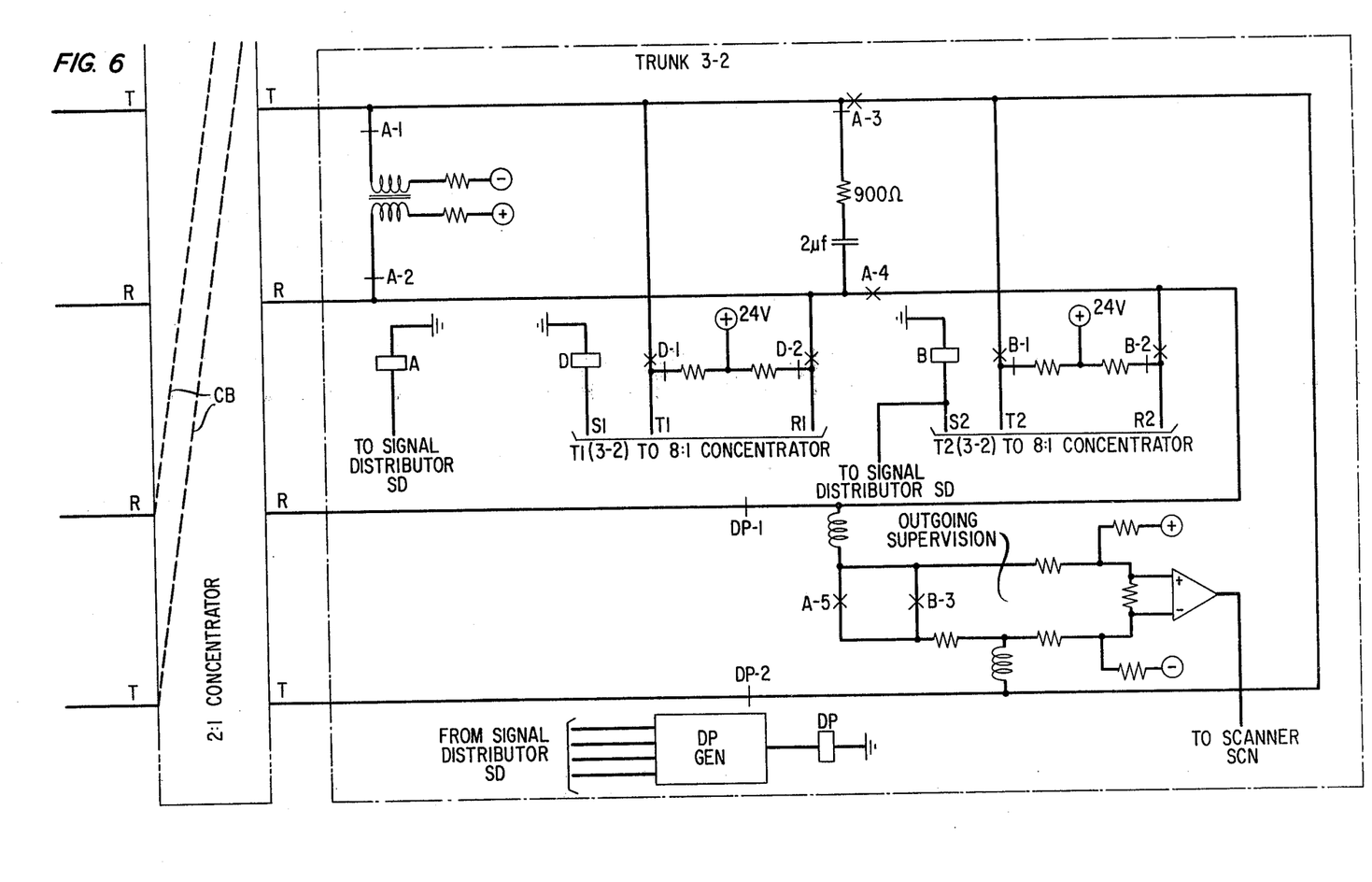
FIG. 6 illustrates circuitry in trunk 3–2 which is substantially identical to that of trunk 3–1.

The SPC then controls signal distributor SD in FIG. 1 to operate relay C in trunk 1-1 in FIG. 3. Make contact C-1 closes and connects resistor LB across the tip and ring leads. This causes the operation of relay E (1-1) in FIG. 3 and indicates to local office LO1 that trunk 1-1 for this call has been recognized and that the operator is ready to receive class of service tones. It should be noted that these E and J relays in FIG. 3 are uniquely associated with trunk 1-1 and the E and J relays in FIG. 5 are uniquely associated with trunk 1-2. Of course, some local offices may provide calling line identification information when the E relay is operated. This can happen on 0- as well as 0+ calls.

The local office then sends class of service tones to the operator in the normal fashion. The operator and calling party are now connected via trunk 1-1, connection CA, trunk 3-1, leads T1 and R1 of T1(3-1) concentrator 8:1, etc., and a conversation should ensue inquiring as to the type and destination of call desired by the calling party. Assuming that the calling party desires to reach someone at station STA2, the operator inputs the 7 digits identifying station STA2 in the normal fashion. These digits are evaluated by the SPC and it determines These digits the called number is associated with originating office L01. Accordingly, the SPC consults its memory map to select an idle auxiliary trunk 1-1 through 1-D. Assuming that trunk 1-2 in FIG. 5 is idle, the SPC generates the appropriate orders to control controller CTR1 to establish connection CB in FIG. 4 between trunks 3-1 and 1-2.

My system is adapted to supply either dial digits or multifrequency tones to the local office depending upon the type of dial pulse detection equipment thereat. It is anticipated that a good share of the offices served by concentrator 2:1 will be small step-by-step offices with only dial pulse detection apparatus. Therefore, a dial pulse generator is associated with each of the 3 trunks while common multifrequency tone generators are provided on network TPN for use if required. It should be recognized that since the dial pulse generator is used for only a short time on each call, it could be common to a group of 3- trunk circuits and connected to the DP relay when needed.

Prior to seizing a local office trunk to complete the call to office L01, the SPC controls signal distributor SD to operate relay CT in trunk 1-2 in FIG. 5. Break contacts CT-1 and CT-2 open in trunk 1-2 to disconnect amplifier OP3 and associated circuitry from the connection since amplifier OP3 is only utilized for incoming supervision. Next, signal distributor SD is controlled to operate relay B in trunk 3-1. Make contact B-3 in trunk 3-1 closes to place resistor LB1 across the tip and ring leads in trunk 3-1. This causes current to flow over the tip and ring leads in trunk 3-1, connection CB, and trunk 1-2 and thereby operates relay E (1-2) in the local office. This seizes this local trunk circuit and renders it responsive to the reception of dial pulses. Normally 4 digits are conveyed to local office LO1 to identify station STA2 and each digit is individually generated under the control of the SPC. It should be remembered that the number identifying station STA2 was previously entered by the operator at position OPPOS1. For each digit, signal distributor SD is controlled by the SPC to apply a 4-digit binary code over leads 4BC in FIG. 4 to dial pulse generator DPG1. Responsive to this binary code, the generator activates and deactivates relay DP in the usual pulse timing relationship to break and then close contacts DP-1 and DP-2 in trunk 3-1. Each time these contacts break, the flow of current through relay E (1-2) in FIG. 5 is interrupted and this relay E detects a dial pulse. The SPC performs interdigit timing between dialed digits by not sending the order for the next digit to signal distributor SD until sufficient time has elapsed to allow the preceding digit to be generated and received. The local office institutes timing in the normal manner after each dialed digit has been received and after a predetermined interval determines that dial pulsing has been completed. Local office LO1 operates in the usual fashion based upon the digits detected by relay E(1-2) to complete the call to station STA2.

Next, the SPC controls signal distributor SD to operate relay A in trunk 3-1. Contacts A-1 and A-2 open to inhibit the application of the previously described negative and positive continuity potentials to the tip and ring leads respectively. Also, the operation of contacts A-3 and A-4 operates to connect the calling and called stations and to place a 900-ohm resistor and capacitor across the tip and ring leads in trunk 3-1 and produces the required termination resistance. Then, signal distributor SD is controlled by the SPC to release relay B in trunk 3-1. Make contact B-3 in trunk 3-1 releases, but the established connection to station STA2 is now maintained by the closed state of contact A-5 in trunk 3-1, which contact was closed when relay A was operated as described above.

Assuming that the called party answers, station STA2 goes off-hook, relay J contacts in FIG. 5 operate to reverse the application of the battery to the tip and ring leads in the normal manner. This reversal is detected by amplifier OP4 in trunk 3-1 and the state of lead SP3 is changed. Scanner SCN detects this change of state and sends in an "answer" report to the SPC. Now, the calling and called stations and the operator are bridged onto the same connection and can speak with each other. If the call is completed successfully, the operator depresses the start timing key and a disconnect key. This causes the SPC to release the connection in network TPN and release the connection in concentrator 8:1. Lead S1 in trunk 3-1 then again assumes ground potential and associated relay D releases. Thus contacts D-1 and D-2 operate to disconnect leads T1 and R1 of leads T1 (3-1) from the connection.

Stations STA1 and STA2 then remain connected over the previously described path (trunk 1-1, connection CA, trunk 3-1, connection CB, trunk 1-2) for the remainder of the call. Assuming now that the calling party disconnects first, calling station STA1 goes on-hook. Relay J releases and contacts J-1 (1-1) and J-2 (1-1) in FIG. 3 release and normal office battery is again applied to the tip and ring leads of trunk 1-1. After several scans of lead SP1, scanner SCN reports a disconnect to the SPC. Responsive to this report, the SPC releases relay A in trunk 3-1. Contacts A-3 and A-4 open to disconnect the calling and called stations. Make contact A-5 in trunk 3-1 again opens removing resistor LB1 from across the tip and ring leads. Relay E (1-2) in FIG. 5 releases because current is no longer flowing over the tip and ring leads in trunk 1-2. This releases this local office trunk associated with station STA2.

Now the SPC determines whether or not any further operator assistance is required. Assuming that no further assistance is required, relay C in trunk 1-1 is released, make contact C-1 opens, and accordingly relay E (1-1) in FIG. 3 releases. This allows trunk 1-1 and the associated local office trunk to be used for other calls.

When the called party disconnects, station STA2 goes on-hook. Relay J associated with station STA2 also releases returning normal battery over the tip and ring leads. Operational amplifier OP4 detects this reversal of battery and so indicates over lead SP3. Scanner SCN then reports the on-hook condition to the SPC. The SPC then releases relay CT in trunk 1-2 to close contacts CT-1 and CT-2.

Each of the 1- trunks is identical to the depicted 1-trunks with the exception that they of course have different terminations. If station STA1 had desired to complete the call to station STA3 instead of STA2, then with reference to FIG. 1 connection CC would have been established in concentrator 2:1 under the control of the SPC. Then the call would have been completed in a manner substantially identical to that described above except now community dial office LON would be involved rather than office LO1.

A more difficult situation arises where the calling party just dials 0 but intends to place a toll call. Now after the original connection is established, from loop-back trunk 3-1 to the operator, in the manner described previously, the SPC evaluates the digits input by the operator and determines that trunk 3-1 cannot be utilized to complete this connection. Accordingly, the SPC controls concentrator 2-1 to break down connection CA and instead to establish a connection such as CD in FIG. 1 to one of the prior art toll trunks such as 2-1. Contact C1 in FIG. 3 remains closed while a new connection is being established and controls the application of low resistance battery to local office LO1 to holdup the connection.

After connection CD is established, continuity tests are performed in the manner substantially as described above. Now the SPC operates the D relay (not shown) or equivalent in trunk 2-1 to reconnect the operator at position OPPOS1 to the calling station. Then relay B (not shown) is operated in trunk 2-1 by the application of a potential to lead S2 of leads T2 (2-1). Then the T2 leads of trunk 2-1 are connected to a multifrequency tone generator terminated on network TPN over the usual route and the called number is outpulsed in the form of multifrequency tones to toll office T0. The A relay (not shown) in trunk 2-1 is operated to connect the operator to the called station and the B relay is released because the T2 signaling path is no longer required. When the called party answers, his or her station goes off-hook, and is detected by the outgoing supervision in trunk 2-1, and the scanner SCN so indicates to the SPC. The calling party, the called party and operator are then connected together. Normally The operator will release after the connection is established and the SPC operates in the manner substantially identical to that described previously to breakdown the "operator" connection. This entails the release of the D relay in trunk 2-1 and the breakdown of connections in concentrator 8:1 in network TPN.

What is claimed is:

1. A traffic service position system comprising a plurality of operator positions (OPPOS1-OPPOSN), a plurality of toll trunks (2-) terminated in a toll office, network and transmission means for connecting said toll trunks to said operator positions including a first concentrator (8:1) connecting said toll trunks to transmission paths (BRT1-BRTN) extendable to said operator positions, and CHARACTERIZED IN THAT said system further comprises a second concentrator (2:1) terminating said toll trunks thereon and physically associated with said first concentrator; a plurality of trunks of a first type (1- ) terminated on said second concentrator and extending thereto from a local office; a plurality of trunks of a second type (3- ) terminated on said second concentrator and extendable therefrom to said local office; a controller (CTR1) for controlling said second concentrator to selectively connect a calling one of said first type trunks to one of said second type trunks or to one of said toll trunks dependent upon the destination of the call; and wherein said network and transmission means also connect said second type trunks to said operator positions.

2. A traffic service position system comprising a plurality of operator positions, a plurality of toll trunks terminated in a toll office, network and transmission means selectively controllable to connect said toll trunks to said operator positions, and data processing means for controlling said network and transmission means and CHARACTERIZED IN THAT said system further comprises a plurality of local trunks of a first type extending to a local office; a plurality of local trunks of a second type extendable to said local office; a concentrator terminating each of said toll trunks, each of said first type local trunks and each of said second type local trunks, said concentrator controllable by said data processing means to connect calling ones of said first type local trunks either to idle ones of said toll trunks or idle ones of said second type local trunks depending upon the anticipated call destination of telephone calls being placed via said calling first type local trunks; and said network and transmission means are also selectively controllable by said data processing means to connect said second type local trunks to said operator positions.

3. A traffic service position system comprising a plurality of operator positions; a plurality of toll trunks terminated in a toll office; network and transmission means controllable to connect said toll trunks to said operator positions including a first concentrator, a lesser number of communication paths and a network; and data processing means for controlling said network and transmission means, wherein THE IMPROVEMENT COMPRISES a second concentrator in physical proximity to said first concentrator; a plurality of local trunks terminated in a local office and on said second concentrator; a plurality of loopback trunks having at least one termination on said second concentrator and extendable back to said local office, each of said loopback trunks also being connectable to said operator positions via said network and transmission means; and said data processing means also controls said second concentrator to connect said local trunks to either said toll trunks or to said loopback trunks.

4. A traffic service position system in accordance with claim 3 wherein said local trunks include means for detecting call destination information received through said local office and for supplying said destination information to said data processing means and wherein said data processing means controls said second concentrator to connect a calling one of said local trunks either to an idle one of said loopback trunks or to an idle one of said toll trunks depending upon the expected destination of the call instituted via said one calling local trunk.

5. A traffic service position system in accordance with claim 3 wherein said local trunks include means for detecting destination information received through said local office and for supplying said destination information to said data processing means and wherein said data processing means (1) controls said second concentrator to connect a calling one of said local trunks to one of said loopback trunks if the destination information for said one calling local trunk only specifies operator assistance or indicates the call is to be completed to said local office, or (2) otherwise controls said second concentrator to connect said one calling local trunk to one of said toll trunks.

6. In a traffic service position system,
a concentrator intermediate a toll office and a local office,
a plurality of trunks of a first type connecting said local office with said concentrator,
a plurality of toll trunks connecting said concentrator with said toll office,
a plurality of trunks of a second type extendible from said concentrator to said local office,
said first type trunks including means for detecting destination information for calls being placed thereover,
selecting and controlling means responsive to destination information detected for a calling one of said first type trunks for selecting an idle toll trunk or an idle second type trunk dependent respectively upon whether the call is destined to a station accessible via said toll office or only requests operator assistance, and for controlling said concentrator to establish a connection from said one calling first type trunk either to said selected toll trunk or to said selected second type trunk, and
network and transmission means for connecting said selected toll trunk or said selected second type trunk to an operator position,
said selecting and controlling means including means for receiving additional destination information for the call from said operator position, and if a connection were established from said one calling first type trunk to said selected second type trunk, said selecting and controlling means controls said concentrator to reestablish said last-mentioned connection from said one calling first type trunk to an idle toll trunk if the additional call destination information indicates the call is destined to a station accessible via said toll office.

7. In combination,
a two-sided concentrator intermediate a local office and a toll office,
a plurality of trunk circuits of a first type associated with said concentrator and connected to said local office and to one side of said concentrator,
a plurality of trunk circuits of a second type associated with said concentrator and connected to said toll office and to the other side of said concentrator,
a plurality of trunk circuits of a third type associated with said concentrator and connected to said other side of said concentrator and connectable to said local office,
a network controller responsive to control information for selectively establishing and disestablishing connections between said first type and second type trunk circuits and between said first type and third type trunk circuits,
means associated with said first type trunk circuits for detecting call destination information for a call extended from said local office to one of said first type trunk circuits,
means for analyzing said call destination information and for providing said network controller with control information specifying that said one first type trunk circuit should be connected to one of said third type trunk circuits if said call destination information only requests operator assistance or if said call is destined for said local office, and otherwise specifying that said one first type trunk circuit should be connected to one of said second type trunk circuits,
transmission means for connecting said one second type trunk circuit or said one third type trunk circuit to an operator position, and
means for receiving additional call destination information for said call from said operator position and applying said additional call destination information to said analyzing means and,
said analyzing means also reanalyzes said additional call destination information and provides said network controller with new control information specifying that said one first type trunk circuit should be reconnected from said one third type trunk circuit to one of said second type trunk circuits if said call is now destined to a station accessible via said toll office.

8. In combination
a network,
a plurality of originating circuits terminated on said network and over which calls are received,
a plurality of toll trunks terminated on said network and in a toll office,
a plurality of local trunks terminated on said network and directly extendible to a local office,
each of said toll trunks and local trunks including a branch extendible to an operator position, and
control means responsive to a calling one of said originating circuits only requesting an operator assistance type call for controlling said network to connect said one originating circuit to one of said local trunks and for extending the branch of said one local trunk to said operator position,
said control means including means for receiving additional call destination information from said operator position and said control means controls said network to reconnect said one originating circuit to one of said toll trunks if said additional call destination information indicates that the call is destined for a station accessible via said toll office.

9. A traffic service position system comprising
a plurality of toll trunks each terminated in a toll office and each including a branch,
a plurality of operator positions,
switching and transmission means, including a first concentrator and a network and a plurality of transmission paths therebetween, controllable to selectively connect the branches of said toll trunks to said operator positions,
data processing means for controlling said switching and transmission means,
and CHARACTERIZED IN THAT said system further comprises
a second concentrator also terminating each of said toll trunks;
a plurality of two-way local trunks each terminated in a local office and on said concentrator and usable to establish connections from said local office to said concentrator and vice versa;
a plurality of loopback trunks each having two terminations on said concentrator and each including a branch;
said data processing means responsive to call destination information for a calling one of said local trunks either for
1. controlling said second concentrator to connect said one local trunk to a termination of one of said loopback trunks if said call destination information indicates only operator assistance is requested or if said call destination information identifies a called station served by said local office, or
2. controlling said second concentrator to connect said one local trunk to one of said toll trunks if said call destination information identifies a called station accessible via said toll office; and wherein
said switching and transmission means is also controllable by said data processing means to selectively connect the branch of said one loopback trunk to one of said operator positions.

10. A traffic service position in accordance with claim 9 further comprising means for detecting additional call destination information, if any, input from said one operator position and wherein said data processing means in response to said detected call destination information (1) controls said concentrator to reconnect said one local trunk to one of said toll trunks if said detected additional call destination information specifies that the call is now destined for a station accessible via said toll office, or (2) controls said concentrator to connect the other termination of said one loopback trunk to another one of said two-way local trunks to route the call back to said local office if the call is still destined for a station served by said local office.

11. In combination,
a network,
a plurality of originating circuits terminated on said network,
a plurality of trunk circuits of a first type terminated on said network and extending to a first destination,
a plurality of trunk circuits of a second type terminated on said network and extending to a second destination,
each of said first type and second type trunk circuits including a branch extendible to an operator position,
data processing means responsive to call destination information received for a calling one of said originating circuits for analyzing said call destination information and for controlling said network to connect said one calling originating circuit to one of said first type trunk circuits, and for extending the branch of said one first type trunk circuit to an operator position, and
said data processing means including means for detecting additional call destination information entered at said operator position and said data processing means reanalyzes said additional call destination information and recontrols said network to reconnect said one calling originating circuit to one of said second type trunk circuits and extends the branch of said one second type trunk circuit to an operator position.

* * * * *